(12) United States Patent
Udani

(10) Patent No.: US 8,832,846 B2
(45) Date of Patent: Sep. 9, 2014

(54) METHODS AND SYSTEMS FOR PROVIDING A NOTIFICATION OF A COMPLIANCE LEVEL OF AN APPLICATION WITH RESPECT TO A PRIVACY PROFILE ASSOCIATED WITH A USER

(75) Inventor: Sanjay Udani, Arlington, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 190 days.

(21) Appl. No.: 13/469,283

(22) Filed: May 11, 2012

(65) Prior Publication Data

US 2013/0305379 A1    Nov. 14, 2013

(51) Int. Cl.
*G06F 21/00* (2013.01)
(52) U.S. Cl.
USPC ............................................................ 726/26

(58) Field of Classification Search
USPC ............................................................ 726/26
See application file for complete search history.

(56) References Cited

U.S. PATENT DOCUMENTS

2012/0084364 A1\*   4/2012   Sivavakeesar ................ 709/205
2013/0232573 A1\*   9/2013   Saidi et al. ..................... 726/22

\* cited by examiner

*Primary Examiner* — Tu Nguyen

(57) ABSTRACT

An exemplary method includes an application management system 1) detecting a request provided by a user to install an application on a user device, 2) identifying a plurality of privacy attributes of the application, 3) determining, based on the identified privacy attributes, a compliance level of the application with respect to a privacy profile associated with the user, the compliance level representing a degree to which the application complies with the privacy profile associated with the user, and 4) directing, prior to the installation of the application, the user device to present a graphic that represents the determined compliance level of the application. Corresponding methods and systems are also disclosed.

25 Claims, 17 Drawing Sheets

Privacy Profile

Privacy Preferences | Yes | No
--- | --- | ---
Allow access to personal information | ☑ | ☐
Allow access to GPS data | ☑ | ☐
Allow distribution of GPS data to 3rd parties | ☐ | ☑
Allow enabling of microphone | ☑ | ☑
Allow access to web history | ☐ | ☐
Allow distribution of web history to 3rd parties | ☐ | ☑

Cancel

Save

METHODS AND SYSTEMS FOR PROVIDING A NOTIFICATION OF A COMPLIANCE LEVEL OF AN APPLICATION WITH RESPECT TO A PRIVACY PROFILE ASSOCIATED WITH A USER

BACKGROUND INFORMATION

As the capabilities of mobile user devices (e.g., smart phones and tablet computers) have proliferated, it has become increasingly difficult for the makers of such mobile user devices (e.g., mobile phone manufacturers) and service providers (e.g., wireless carriers) to control how the various capabilities of mobile user devices are used. For example, many mobile user devices now have the ability to acquire location-based data (e.g., global positioning services ("GPS") data), capture photographs, access the Internet via WiFi, access network-based services (e.g., email services), store personal information, and perform other functions with little or no third party control or regulation (e.g., with little or no oversight by the mobile user device makers and/or service providers).

On one hand, these uncontrolled capabilities of mobile user devices provide users thereof with flexibility, increased productivity, and enjoyment. However, they can sometimes be problematic from a user's privacy point of view. For example, many users enjoy downloading and installing applications ("apps") onto mobile user devices. These applications often utilize the various uncontrolled capabilities of a mobile user device (e.g., by accessing personal information stored by the mobile user device, enabling a hardware component of the mobile user device, accessing a web browsing history stored by the mobile user device, etc.). Some applications even transmit data generated and/or stored by the mobile user device to remote servers for processing, remote storage, and/or distribution to third parties. Such activity is often performed unbeknownst to the user.

In an attempt to alleviate privacy concerns and to absolve itself of legal liability, an application developer or provider may require a user to agree to a privacy policy before the user can install a particular application on a mobile user device. The privacy policy may attempt to disclose the various ways in which the application and/or application developer or provider will acquire, use, disclose, and/or manage data generated and/or stored by the mobile user device. The privacy policy may additionally or alternatively attempt to disclose the various ways in which the application may utilize the various features (e.g., hardware capabilities) of the mobile user device. However, privacy policies in general are lengthy, complex, and confusing. Hence, the vast majority of users agree to the privacy policies without even attempting to read them and are therefore unaware of the potentially invasive activities that the application may perform.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 2 shows an exemplary graphical user interface ("GUI") that may be presented to facilitate manual specification by a user of one or more privacy preferences represented by a privacy profile according to principles described herein.

DETAILED DESCRIPTION OF PREFERRED EMBODIMENTS

Methods and systems for providing a notification of a compliance level of an application with respect to a privacy profile associated with a user are described herein. For example, as will be described below, an application management system may 1) detect a request provided by a user to install an application on a user device (e.g., a smart phone, a tablet computer, a personal computer, etc.), 2) identify a plurality of privacy attributes of the application, 3) determine, based on the identified privacy attributes, a compliance level of the application with respect to a privacy profile associated with the user, the compliance level representing a degree to which the application complies with the privacy profile associated with the user, and 4) direct, prior to the installation of the application, the user device to present a graphic that represents the determined compliance level of the application.

The methods and systems described herein may allow a user to readily ascertain whether a particular application that the user desires to install on a user device complies with a privacy profile representing or defining a plurality of privacy preferences of the user. For example, the user may attempt to download and install an application onto a mobile device (e.g., a smart phone or a tablet computer). Before the application is installed, the application management system described herein may identify one or more types of data generated and/or stored by the mobile device that the application accesses, manipulates, distributes, and/or otherwise uses. The application management system may then compare these identified privacy attributes of the application with the privacy preferences defined in the user's privacy profile and assign a compliance level to the application based on the comparison. A graphic representing the predefined compliance level may then be presented to the user. As will be described below, the compliance level assigned to the application may be one of a plurality (e.g., one of three) predefined and standardized compliance levels. Furthermore, the graphic representing the assigned compliance level may be configured to have a consistent look and feel regardless of the particular application being installed. In this manner, the user may readily recognize the degree to which any application being installed on the user device complies with the user's privacy profile.

Figure 1:
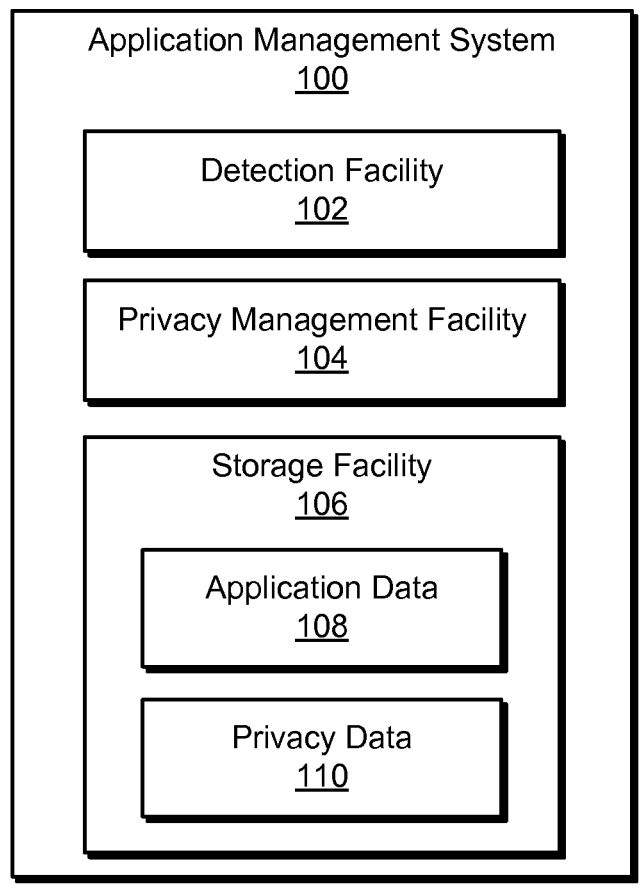
FIG. 1 illustrates an exemplary application management system according to principles described herein.

FIG. 1 illustrates an exemplary application management system 100 ("system 100"). As shown, system 100 may include, without limitation, a detection facility 102, a privacy management facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation.

Detection facility 102 may be configured to detect a request provided by a user to install an application on a user device (e.g., a mobile device, a personal computer, or any other type of computing device). As used herein, an "application" refers to any software program, update, module, component, or product that may be at least partially installed on a user device. For example, an application may include a mobile application (i.e., an "app" that may be installed on a smart phone or tablet computer), a software program configured to be installed on a personal computer, an add-on to an Internet browser, a network-based application configured to have a portion thereof installed on a user device, and/or any other type of application as may serve a particular implementation.

Detection facility 102 may detect the request provided by the user to install the application on the user device in any suitable manner. For example, detection facility 102 may detect that an operating system of the user device has initiated an installation process to install the application. Additionally or alternatively, detection facility 102 may detect a commencement of an installation process associated with a downloading of the application.

Privacy management facility 104 may be configured to perform one or more privacy management operations. For example, privacy management facility 104 may be configured to facilitate creation by a user of a privacy profile. As used herein, a "privacy profile" represents or defines a plurality of privacy preferences associated with a user with respect to how applications may interact with a user device associated with the user (i.e., how the applications may access and/or utilize data acquired, generated, and/or stored by the user device and/or how the applications may access and/or utilize the various features (e.g., hardware capabilities) of the user device). For example, a privacy profile may specify various types of information that the user does not want applications to access, use, and/or disclose to other entities, ways in which the applications and/or entities associated with the applications (e.g., providers of the applications) may access and/or use data acquired, generated, and/or stored by the user device, identify specific features (e.g., hardware capabilities) of the user device that applications may or may not access and/or use, and/or any other type of privacy preference of the user.

Privacy management facility 104 may facilitate creation by a user of a privacy profile any suitable manner. For example, privacy management facility 104 may provide the user with an option to manually specify one or more privacy preferences represented by the privacy profile. To illustrate, FIG. 2 shows an exemplary graphical user interface ("GUI") 200 that may be presented by privacy management facility 104 (e.g., by directing a user device associated with the user to display GUI 200) in order to facilitate manual specification by a user of one or more privacy preferences represented by a privacy profile. As shown, the user may specify a plurality of privacy preferences by selecting "yes" or "no" next to each of a plurality of privacy-related statements displayed within GUI 200. In the particular example of FIG. 2, the user has indicated within GUI 200 that he or she is okay with applications accessing the user's personal information, GPS data, and web history, but that he or she is not okay with applications and/or entities associated with the applications distributing the user's GPS data to third parties, enabling the microphone of the user device, or distributing the user's web history to third parties.

It will be recognized that the user may be allowed to specify any number of privacy preferences within GUI 200 as may serve a particular implementation. For example, in some implementations, the user may be allowed to specify up to several dozen or even several hundred privacy preferences within GUI 200.

Figure 3:
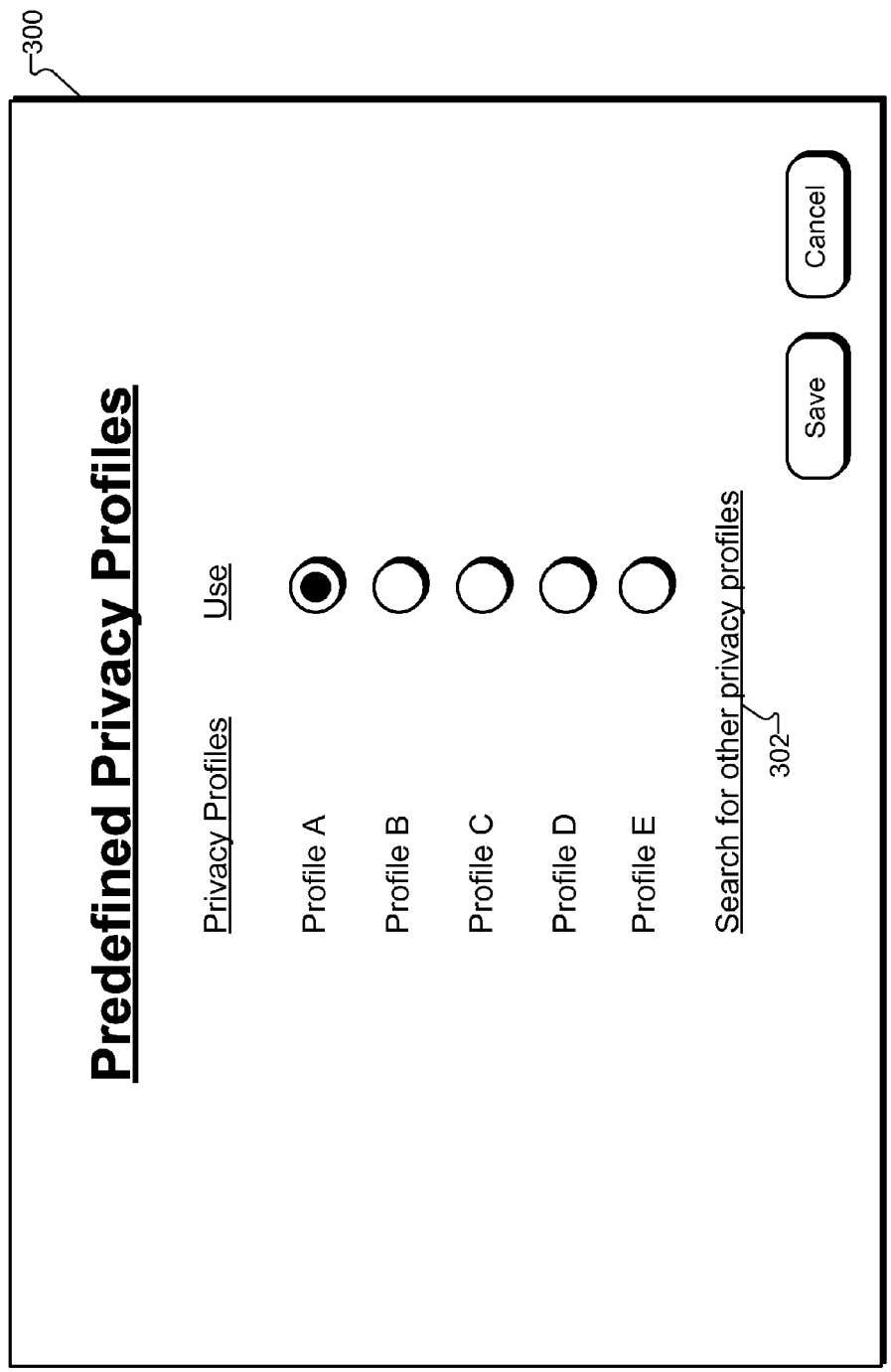
FIG. 3 shows an exemplary GUI that may be presented to facilitate selection of a predefined privacy profile according to principles described herein.

Additionally or alternatively, privacy management facility 104 may provide the user with an option to select a predefined privacy profile as a privacy profile associated with the user. This may be beneficial in cases where the user does not desire to manually specify a large number of privacy preferences. To illustrate, FIG. 3 shows an exemplary GUI 300 that may be presented by privacy management facility 104 in order to facilitate selection of a predefined privacy profile. As shown, a list of predefined privacy profiles (e.g., "Profile A" through "Profile E") may be presented to the user within GUI 300. An option 302 (e.g., a hyperlink) may additionally be provided that allows the user to search for (e.g., browse the Internet for) other privacy profiles not listed within GUI 300.

Each predefined privacy profile shown within GUI 300 may define a distinct set of privacy preferences. For example, the list of predefined privacy profiles may include privacy profiles of varying stringency, type, and/or target audience. In this manner, the user may select a particular privacy profile that most closely matches the user's preferences. For example, FIG. 3 shows that the user has selected an option to use the privacy profile named "Profile A." In some examples, once a predefined privacy profile is selected, the user may be allowed to customize the selected privacy profile by manually changing one or more of the privacy preferences defined by the selected privacy profile.

In some examples, the predefined privacy profiles shown in GUI 300 may be provided by privacy management facility 104, one or more independent third-parties (e.g., one or more privacy watchdog organizations, governmental agencies, etc.), a network service provider (e.g., a wireless carrier), a maker of the user device, another user (e.g., a social media contact of the user), and/or any other entity and/or person as may serve a particular implementation. As such, the predefined privacy profiles may be updated or otherwise modified from time to time by the providers of the predefined privacy profiles. Hence, in some examples, privacy management facility 104 may detect a change (e.g., an update) in a predefined privacy profile that the user has selected as his or her privacy profile and automatically update the user's privacy profile in accordance with the change in the predefined privacy profile.

In some examples, a privacy profile may apply generally to all applications that are to be installed on a user device. Alternatively, a privacy profile may apply to a specific application. For example, a privacy profile may be created for a particular application that is relatively popular.

In some examples, data representative of the privacy profile associated with the user may be maintained (e.g., stored) locally by the user device. Alternatively, as will be described in more detail below, data representative of the privacy profile associated with the user may be maintained remotely (e.g., by a server, another user device associated with the user, and/or any other computing device remote from the user device).

In some examples, privacy management facility 104 may facilitate creation by a user of a privacy profile that is to be associated with another user. For example, GUIs 200 and/or 300 may allow a parent to create a privacy profile for a child and thereby ensure that the child does not download and install applications that do not comply with a desired set of privacy preferences. An example of this will be provided in more detail below.

Privacy management facility 104 may be further configured to notify a user attempting to install an application on a user device of a compliance level of the application with respect to a privacy profile associated with the user. For example, privacy management facility 104 may identify a plurality of privacy attributes of the application, determine, based on the identified privacy attributes, a compliance level of the application with respect to the privacy profile associated with the user, and direct, prior to the installation of the application, the user device to present a graphic that represents the determined compliance level of the application. Each of these operations will now be described in detail.

As mentioned, privacy management facility 104 may identify a plurality of privacy attributes of the application. As used herein, a "privacy attribute" of an application describes or specifies a privacy-related manner in which the application interacts with a user device. For example, a privacy attribute of an application may describe or specify particular types of data or information that the application accesses when executed by the user device, how the application and/or an entity associated with the application uses and/or stores the specified data or information, whether the application and/or an entity associated with the application distributes the specified data or information to third parties, particular features (e.g., hardware capabilities) of the user device that the application accesses and/or uses, and/or any other manner in which the application interacts with the user device.

Privacy management facility 104 may identify a plurality of privacy attributes of an application in any suitable manner. For example, privacy management facility 104 may analyze a privacy policy associated with the application and identify the privacy attributes based on the analysis of the privacy policy. As used herein, a "privacy policy" associated with an application refers to an electronic document, specification, or other official statement that describes or lists the privacy attributes of the application. For example, a privacy policy associated with an application may include the formalized privacy policy that users are often required to agree to prior to installing an application. In some examples, privacy management facility 104 may analyze a privacy policy associated with an application by using one or more text analysis heuristics that identify privacy attributes associated with the application that are included in the privacy policy.

Additionally or alternatively, privacy management facility 104 may identify privacy attributes of an application by analyzing any other data associated with an application. For example, a file containing a list of privacy attributes of the application may be provided with one or more installation files associated with the application. Privacy management facility 104 may analyze the file containing the list of the privacy attributes and identify the privacy attributes accordingly.

In some examples, privacy management facility 104 may identify privacy attributes of an application by querying a provider of the application. For example, privacy management facility 104 may transmit data representative of a request for the privacy attributes of an application to a server maintained by a provider of the application provider of the application. In response, the server may transmit data representative of the privacy attributes to privacy management facility 104.

Additionally or alternatively, privacy management facility 104 may query an entity not associated directly with the application for the privacy attributes of the application. For example, an independent third-party (e.g. a privacy watchdog organization, a governmental agency, etc.) may maintain data representative of privacy attributes of various applications. Privacy management facility 104 may accordingly obtain data representative of the privacy attributes of the application from the independent third-party, such as by querying a server and/or a web site maintained by the independent third-party for privacy attributes of an application.

Once privacy management facility 104 has identified the privacy attributes of an application, privacy management facility 104 may determine a compliance level of the application with respect to a privacy profile associated with the user. As mentioned, a "compliance level" of an application with respect to a privacy profile associated with a user represents a degree to which the application complies with the privacy profile (i.e., privacy preferences) associated with the user.

Privacy management facility 104 may determine a compliance level of an application with respect to a privacy profile associated with a user in any suitable way. For example, privacy management facility 104 may identify a plurality of privacy preferences represented by the privacy profile associated with the user, compare the privacy attributes of the application with the privacy profile (i.e., the privacy preferences) associated with the user, and determine the compliance level of the application based on the comparison.

For example, privacy management facility 104 may select, based on the comparison, a particular compliance level for the application from a plurality of predefined compliance levels (i.e., assign a particular compliance level selected from a plurality of predefined compliance levels to the application). The predefined compliance levels may be standardized. In other words, the same compliance levels may be defined and used to represent degrees of compliance of many different applications with respect to the privacy profile of the user. In this manner, the user may readily recognize the degree to which any application being installed on the user device complies with the user's privacy profile.

To illustrate, privacy management facility 104 may select, based on the comparison, a particular compliance level for the application from three predefined and standardized compliance levels—a "high" compliance level, a "medium" compliance level, and a "low" compliance level. As used herein, a "high" compliance level represents a relatively high degree of compliance with a privacy profile associated with a user, a "low" compliance level represents a relatively low degree of compliance with the privacy profile associated with the user, and the "medium" compliance level represents a degree of compliance with the privacy profile associated with the user that is between the relatively high and low degrees of compliance. While high, medium, and low compliance levels are described and used in the examples described herein, it will be recognized that there may be any number of predefined compliance levels as may serve a particular implementation.

The relative degrees of compliance between the high, medium, and low compliance levels may be specified in any suitable manner. For example, the high compliance level may be assigned to only those applications that fully comply with the privacy profile associated with the user. Alternatively, the high compliance level may be assigned to applications that comply with a predetermined number and/or type of privacy preferences associated with the user. Likewise, the low compliance level may be assigned to only those applications that comply with less than a predetermined number and/or type of privacy preferences associated with the user.

In some examples, selection of a particular predefined compliance level may be performed based on a weighted importance of one or more privacy preferences associated with the user. For example, the user may specify that a particular privacy preference must be complied with in order for an application to qualify for the high compliance level. If an application does not comply with the specified privacy preference, the application cannot be assigned a high compliance level, regardless of whether the application complies with any of the other privacy preferences associated with the user. To illustrate, the user may specify that an application cannot access data representative of his or her contacts in order for the application to qualify for the high compliance level. If privacy management facility 104 subsequently determines that an application does access data representative of the user's contacts, the application will be assigned either a medium or low compliance level, depending on how the privacy attributes of the application compare to the other privacy preferences associated with the user.

Once a compliance level of an application has been determined, privacy management facility 104 may direct, prior to the installation of the application (e.g., at some point during an installation process of the application but before the installation of the application is completed), the user device to present a graphic that represents the determined compliance level of the application. In this manner, the user who desires to install the application (and/or another user, as will be described below) may readily ascertain how the application complies with the privacy profile associated with the user.

For example, if the compliance level of the application is determined by selecting a compliance level from a plurality of predefined compliance levels, each predefined compliance level may have a particular graphic associated therewith that may be presented to the user. To illustrate, the high compliance level may have a first graphic associated therewith, the medium compliance level may have a second graphic associated therewith, and the low compliance level may have a third graphic associated therewith. Privacy management facility 104 may direct the user device to present one of these graphics depending on the particular compliance level selected so that the user can readily recognize which compliance level has been assigned to the application.

Figure 4:
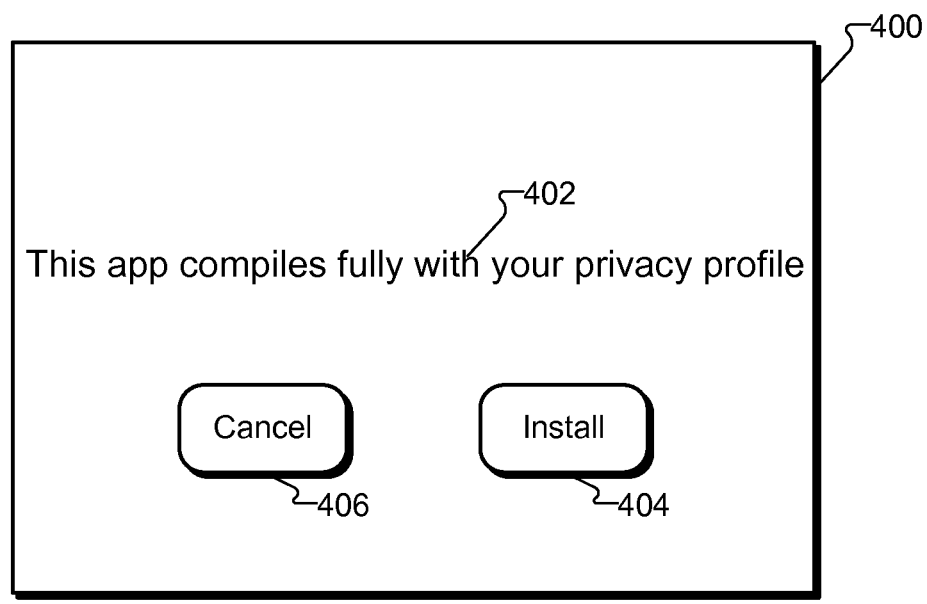
FIGS. 4-9 show various exemplary notification graphics that may be presented by the system of FIG. 1 according to principles described herein.

To illustrate, FIG. 4 shows a graphic 400 that may be presented if a high compliance level is selected by privacy management facility 104 for an application being installed by a user on a user device. Graphic 400 (as well as other graphics described herein) may be presented by the user device in any suitable manner (e.g., in the form of a pop-up window, a Short Message Service ("SMS") message, a Multimedia Message Service ("MMS") message, an email, an alert, etc.).

As shown, graphic 400 may include content 402 configured to indicate that the application has a relatively high degree of compliance with the privacy profile associated with the user. For example, in the example of FIG. 4, content 402 includes text stating that the application fully complies with the user's privacy profile. Content 402 may additionally or alternatively contain any other content (e.g., text-based content, image-based content, and/or any other type of content) configured to represent the high compliance level.

As shown, graphic 400 may also include a selectable option 404 to proceed with the installation of the application on the user device and a selectable option 406 to terminate the installation of the application on the user device. In this manner, the user may decide, based on the information conveyed by graphic 400, whether or not to actually install the application.

Figure 5:
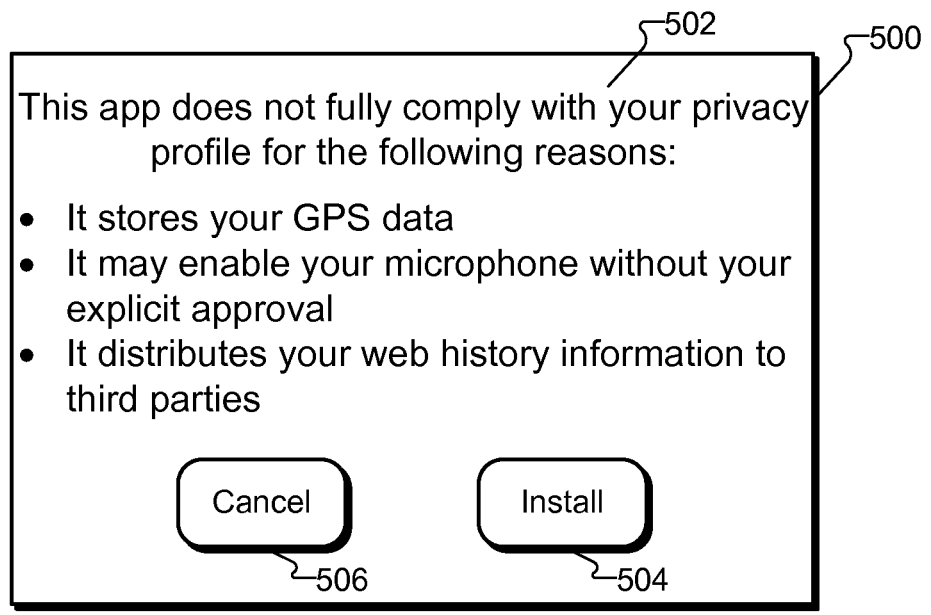

FIG. 5 shows a graphic 500 that may be presented if a medium compliance level is selected by privacy management facility 104 for an application being installed by a user on a user device. Graphic 500 may include content 502 configured to indicate that the application has a medium degree of compliance with the privacy profile associated with the user (e.g., that the application partially complies with the privacy profile associated with the user). For example, as shown in FIG. 5, content 502 may include a description of one or more privacy attributes of the application that are not in compliance with the privacy profile associated with the user. Content 502 may additionally or alternatively contain any other content (e.g., text-based content, image-based content, and/or any other type of content) configured to represent the medium compliance level.

As shown, graphic 500 may also include a selectable option 504 to proceed with the installation of the application on the user device and a selectable option 506 to terminate the installation of the application on the user device. In this manner, the user may decide, based on the information conveyed by graphic 500, whether or not to actually install the application.

Figure 6:
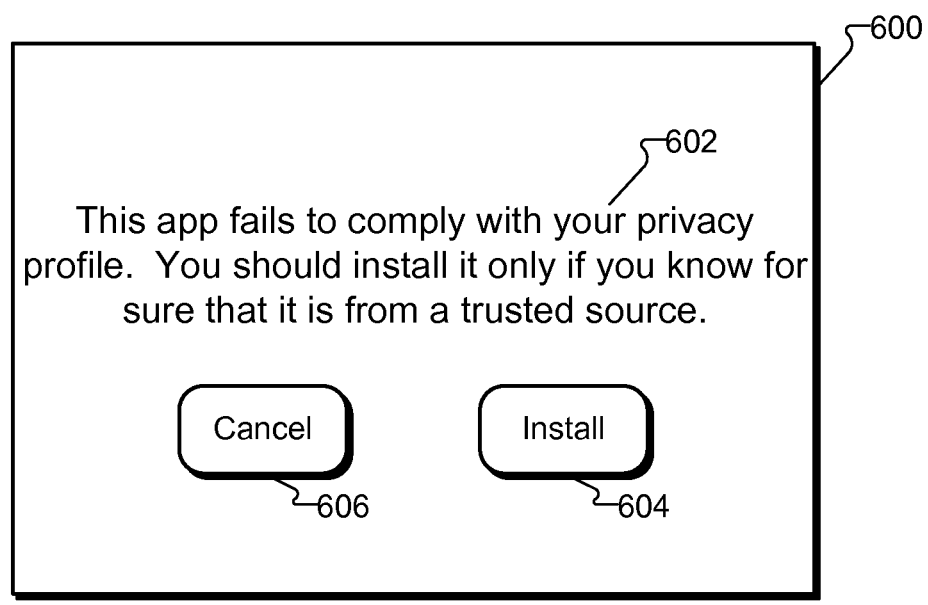

FIG. 6 shows a graphic 600 that may be presented if a low compliance level is selected by privacy management facility 104 for an application being installed by a user on a user device. Graphic 600 may include content 602 configured to indicate that the application has a low degree of compliance with the privacy profile associated with the user. For example, content 602 includes text stating that the application fails to comply with the privacy profile associated with the user and that the user should only install the application if he or she knows that the application comes from a trusted source. Content 602 may additionally or alternatively contain any other content (e.g., text-based content, image-based content, and/or any other type of content) configured to represent the low compliance level.

As shown, graphic 600 may also include a selectable option 604 to proceed with the installation of the application on the user device and a selectable option 606 to terminate the installation of the application on the user device. In this manner, the user may decide, based on the information conveyed by graphic 600, whether or not to actually install the application.

In some examples, the content included in graphics 400, 500, and 600 may be determined, specified, or otherwise provided by any suitable entity. For example, the content may be specified by one or more privacy watchdog organizations, governmental agencies, network service providers, user device makers, and/or other entities and/or persons as may serve a particular implementation. In some examples, the content included in graphics 400, 500, and 600 may be presented using the same layout, positioning, wording, or other consistent attribute so as to provide a consistent look and feel regardless of the particular application being installed.

In some examples, graphics 400, 500, and 600 may be visually distinct one from another. For example, each graphic may have a different background color. To illustrate, graphic 400 may have a background color of green, graphic 500 may have a background color of yellow, and graphic 600 may have a background color of red. In this manner, a user may immediately recognize, based on the background color of a graphic alone, the compliance level associated with a particular graphic that has been presented by the user device. Each graphic may additionally or alternatively have any other visually distinguishing characteristic as may serve a particular implementation.

In some examples, if privacy management facility 104 determines that the application does not fully comply with a user's privacy profile, privacy management facility 104 may be configured direct the user device to present an option to install an upgraded version of the application that more fully complies with the user's privacy profile. To this end, privacy management facility 104 may first determine whether an upgraded version of the application exists (e.g., by querying a provider of the application) and determine how the upgraded version of the application compares to the privacy profile of the user. If a suitable upgraded version exists, privacy management facility 104 may direct the user device to present an option to install the upgraded version of the application.

Figure 7:
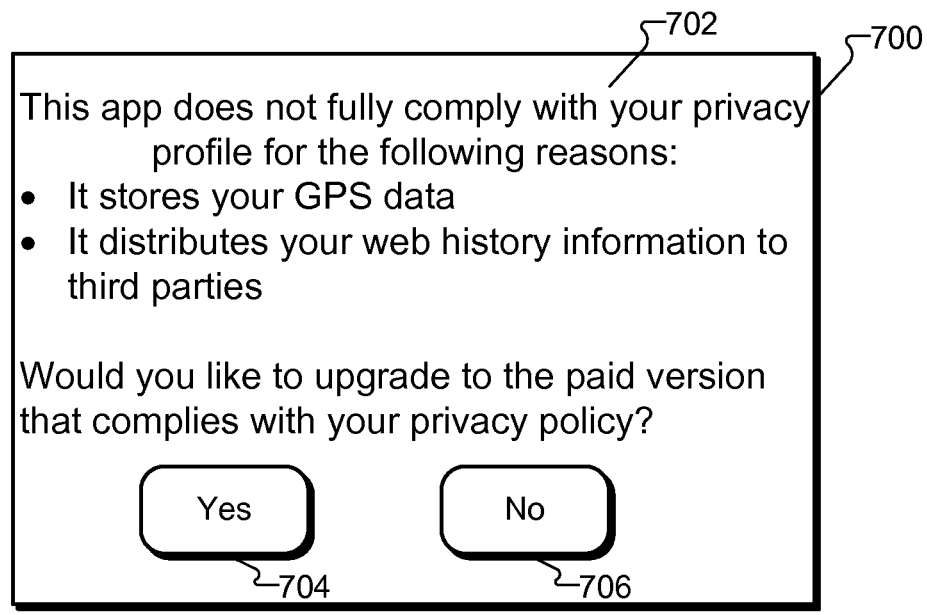

For example, FIG. 7 shows an exemplary graphic 700 that may be presented by a user device in response to a determination that an application does not fully comply with a user's privacy profile. As shown, graphic 700 may include content 702 configured to indicate that the application does not fully comply with the user's privacy profile. Graphic 700 may further include a selectable option 704 to install an upgraded application that complies with the user's privacy policy and a selectable option 706 to proceed with installation of the non-upgraded version of the application.

Privacy management facility 104 may be additionally or alternatively configured to notify an additional user (e.g., a parent) when a user (e.g., a child) attempts to install an application that does not fully comply with a privacy profile associated with the user. For example, privacy management facility 104 may detect that an application does not fully comply with a privacy profile associated with a first user and, in response, present a graphic to a second user so that the second user may authorize or prevent the first user from installing the application.

Figure 8:
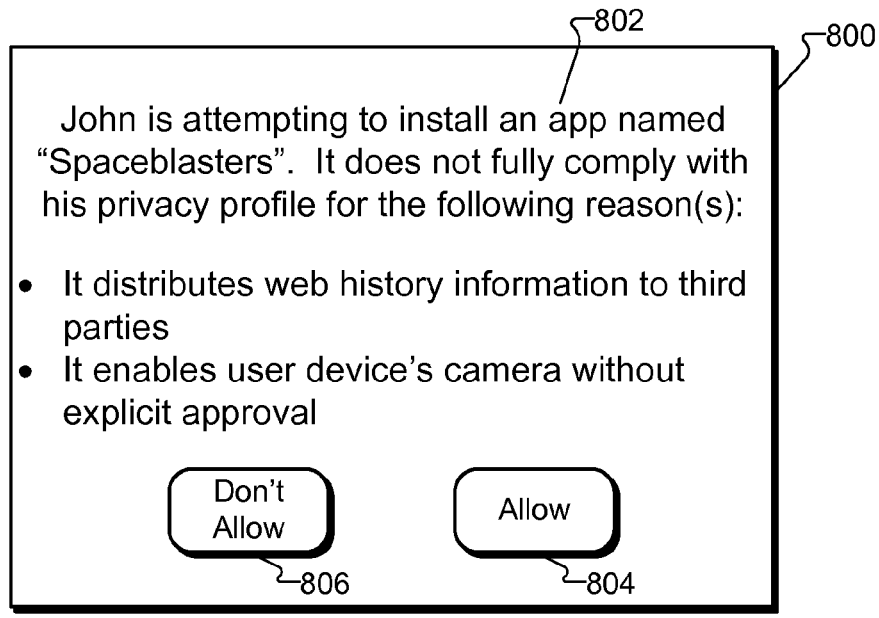

To illustrate, FIG. 8 shows an exemplary graphic 800 that may be presented to a parent when the parent's child attempts to install an application that does not fully comply with a privacy profile that the parent has created for the child. As shown, graphic 800 may include content 802 notifying the parent of the attempted installation and describing how the application fails to comply with the child's privacy profile. Graphic 800 may also include a selectable option 804 to authorize the child to install the application on the user device and a selectable option 806 to prevent the user from installing the application on the user device. Selection of option 804, for example, may be configured to transmit a command to the user device to allow installation of the application on the user device. Selection of option 806, on the other hand, may be configured to transmit a command to the user device to cancel installation of the application.

In some examples, privacy management facility 104 may be further configured to perform one or more privacy management operations with respect to an application that is already installed on the user device. For example, privacy management facility 104 may identify a plurality of privacy attributes of an application that is already installed on the user device, determine, based on the identified privacy attributes of the already installed application, a compliance level of the already installed application with respect to a privacy profile associated with the user, and direct the user device to present a graphic that represents the determined compliance level of the of the already installed application.

Figure 9:
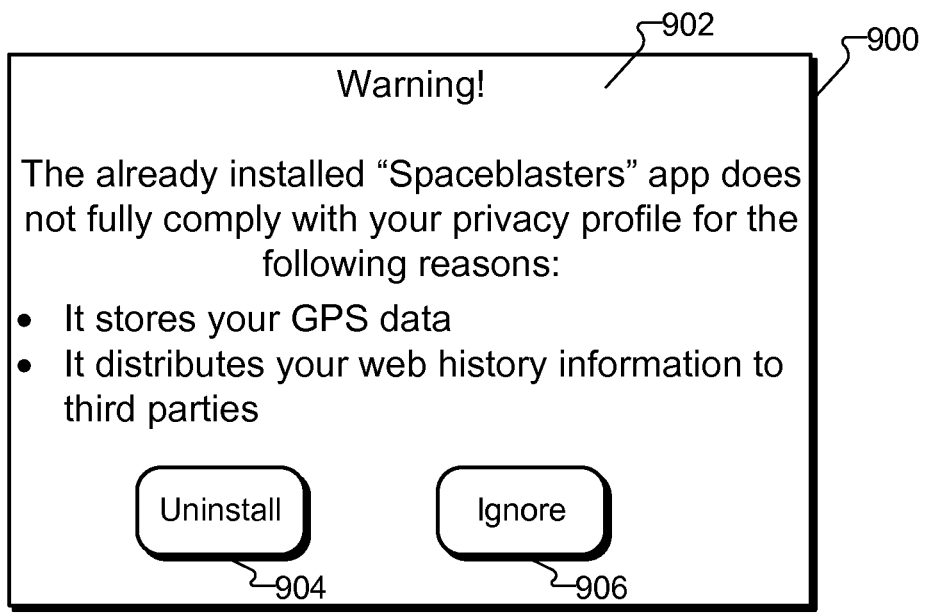

To illustrate, FIG. 9 shows an exemplary graphic 900 that may be presented by a user device in response to a determination that an application that has already been installed on the user device does not fully comply with a user's privacy profile. As shown, graphic 900 may include content 902 configured to provide a warning that the application does not fully comply with the user's privacy profile. Graphic 900 may further include a selectable option 904 to uninstall the application and a selectable option 906 to ignore the warning. In this manner, the user may be advised of (and, if desired, uninstall) any already installed applications that do not comply with the user's privacy profile.

Privacy management facility 104 may be further configured to perform one or more other operations with respect to an application that is already installed on the user device. For example, privacy management facility 104 determine that an already installed application includes malware and/or otherwise identify one or more issues with the application and provide the user with an option to uninstall, fix, or otherwise address the application.

In some examples, privacy management facility 104 may be further configured to provide data representative of a determined compliance level for a particular application to a provider of the application and/or any other entity. In this manner, the provider of the application (or other entity) may evaluate how the application complies with privacy profiles associated with different users.

Returning to FIG. 1, storage facility 106 may be configured to maintain application data 108 representative of and/or otherwise associated with one more applications that may be installed on the user device and/or privacy data 110 generated and/or utilized by privacy management facility 104. For example, privacy data 110 may include, but is not limited to, data representative of one or more privacy attributes of one or more applications, one or more privacy profiles associated with one or more users, etc. Storage facility 106 may maintain additional or alternative data as may serve a particular implementation.

Various implementations of system 100 will now be described. It will be recognize that the implementations described herein are merely illustrative and that additional or alternative implementations of system 100 may be realized in accordance with the methods and systems described herein.

Figure 10:
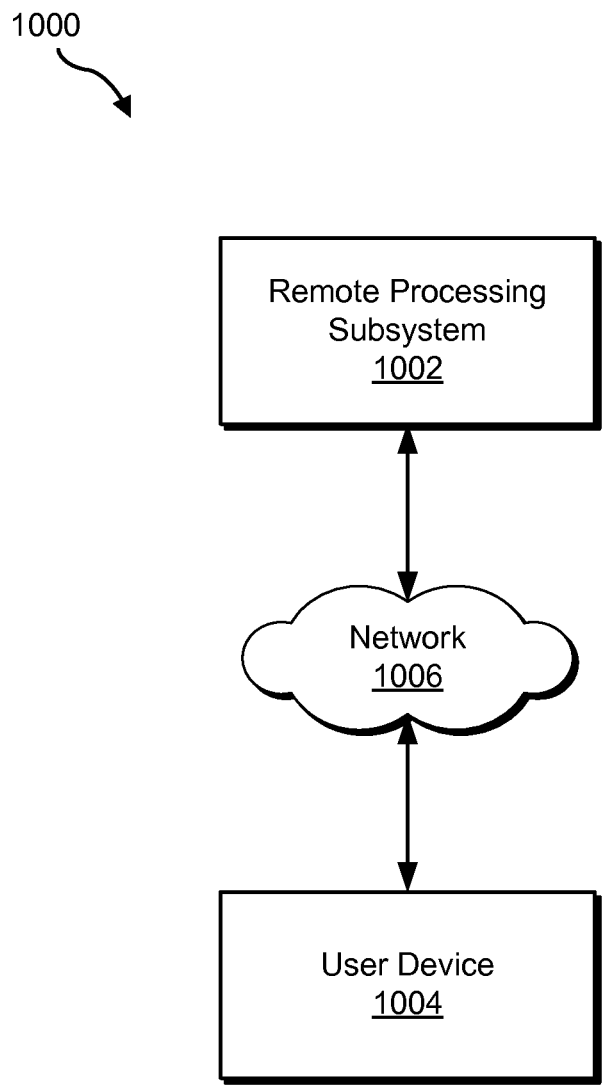
FIGS. 10-14 illustrate various exemplary implementations of the system of FIG. 1 according to principles described herein.

FIG. 10 illustrates an exemplary implementation 1000 of system 100 wherein a remote processing subsystem 1002 is communicatively coupled to a user device 1004 by way of a network 1006. As will be described in more detail below, detection facility 102, privacy management facility 104, and storage facility 106 may each be implemented by remote processing subsystem 1002 and/or user device 1004.

Remote processing subsystem 1002 may be associated with (e.g., managed by) any suitable entity. For example, remote processing subsystem 1002 may be associated with one or more privacy watchdog organizations, governmental agencies, network service providers (e.g., wireless carriers, Internet service providers, etc.), application providers, user device makers, etc. Remote processing subsystem 1002 may be implemented by one or more computing devices (e.g., one or more servers) as may serve a particular implementation. For example, remote processing subsystem 1002 may be implemented by one or more servers configured to provide one or more privacy management operations associated with one or more applications that may be installed by user device 1004.

User device 1004 may be implemented by any suitable computing device. For example, user device 1004 implemented by one or more mobile devices (e.g., smart phones, mobile phones, and/or tablet computers), personal computers, set-top box devices, digital video recording ("DVR") devices, personal-digital assistant devices, gaming devices, television devices, etc. In some examples, user device 1004 may be capable of downloading and/or installing one or more applications. For example, user device 1004 may be capable of downloading and installing one or more applications from the Internet.

Remote processing subsystem 1002 and user device 1004 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Remote processing subsystem 1002 and user device 1004 may communicate using any suitable network. For example, as shown in FIG. 2, remote processing subsystem 1002 and user device 1004 may be configured to communicate with each other by way of network 206. Network 206 may include one or more networks or types of networks capable of carrying communications and/or data signals between remote processing subsystem 1002 and user device 1004. For example, network 206 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network (e.g., a WiFi network or a home network), any other suitable network, and/or any combination or sub-combination of these networks.

In certain embodiments, system 100 may be implemented entirely by remote processing subsystem 1002 or by user device 1004. In other embodiments, components of system 100 may be distributed across any combination of remote processing subsystem 1002 and user device 1004.

Figure 11:
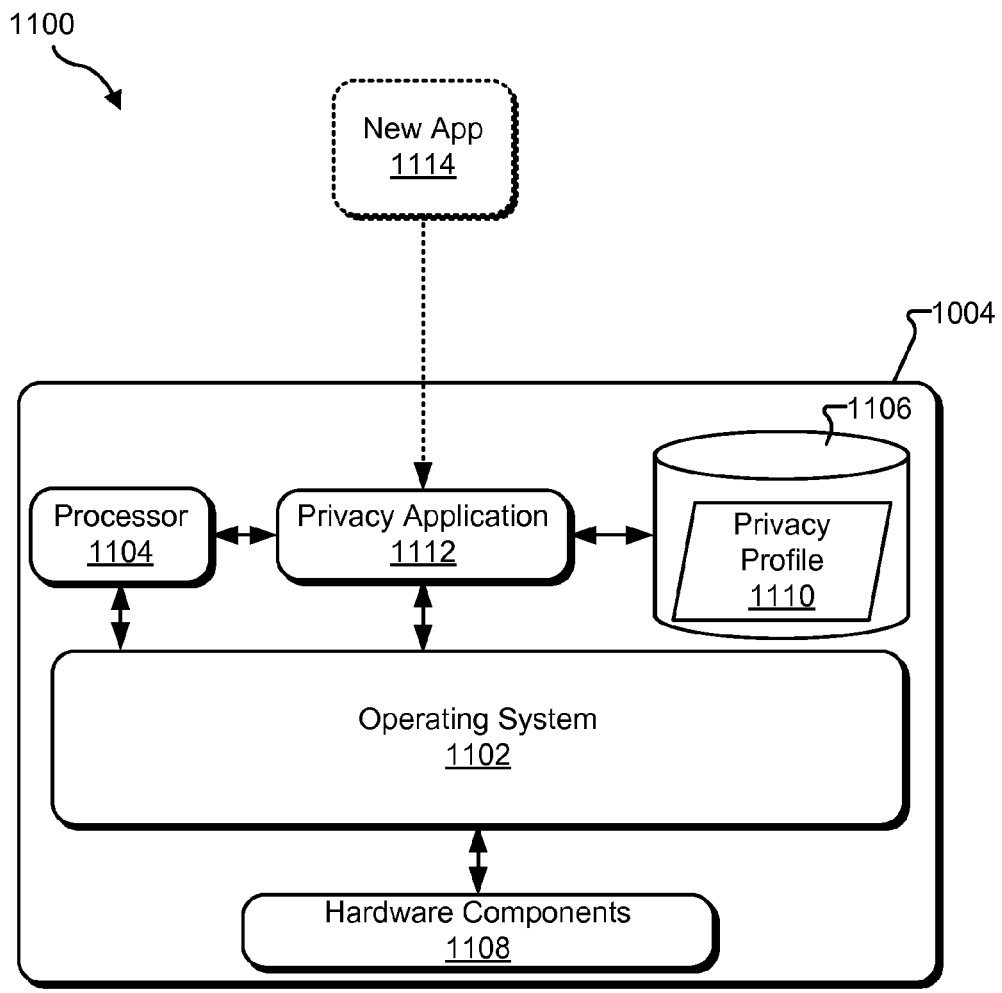

To illustrate, FIG. 11 shows an exemplary configuration 1100 wherein system 100 is implemented entirely by user device 1004. As shown, user device 1004 may include an operating system 1102, a processor 1104, a data store 1106, and hardware components 1108 communicatively coupled one to another.

Operating system 1102 may be configured to direct processor 1104 to perform one or more functions associated with user device 1004. For example, operating system 1102 may direct processor 1104 to utilize one or more of hardware components 1108 (which may include, but are not limited to, a camera, GPS hardware, a radio, WiFi hardware, etc.) to perform one or more functions in response to user interaction with user device 1004. Operating system 1102 may include any suitable operating system as may serve a particular implementation. Likewise, processor 1104 may include any suitable processing device or combination of processing devices as may serve a particular implementation.

Data store 1106 may include any suitable storage device and may be configured to locally store or maintain data generated and/or used by user device 1004. For example, as shown in FIG. 11, data store 1106 may be configured to store privacy profile data 1110 representative of a privacy profile associated with a user of user device 1004.

In some examples, as shown in FIG. 11, a privacy application 1112 may reside on and be executed by user device 1004. Privacy application 1112 may be configured to perform (e.g., by directing processor 1104 to perform) one or more of the privacy management operations described herein. For example, as illustrated in FIG. 11, privacy application 1112 may be used (e.g., by system 100) to detect a request provided by a user to install a new application 1114 on user device 1004, identify a plurality of privacy attributes of the new application 1114, determine a compliance level of the new application 1114 with respect to the privacy profile represented by privacy profile data 1110, and direct user device 1004 to present a graphic that represents the determined compliance level of the new application 1114.

In some examples, privacy application 1112 may be a stand-alone application that may be downloaded or otherwise installed on user device 1004. Alternatively, privacy application 1112 may be integrated into operating system 1102. Privacy application 1112 may reside on user device 1004 in any other manner as may serve a particular implementation.

Figure 12:
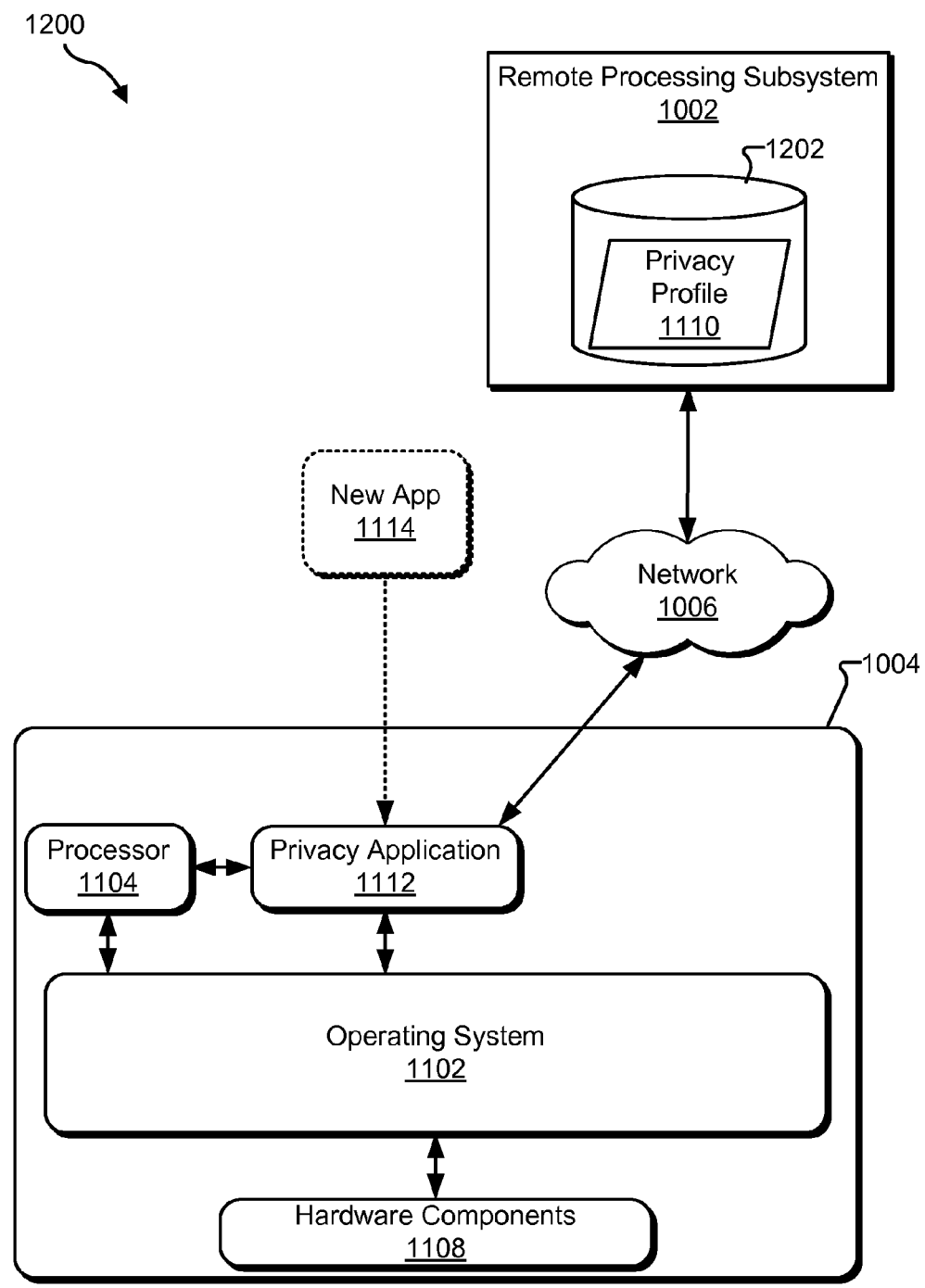

FIG. 12 shows an alternative configuration 1200 wherein system 100 is implemented by user device 1004 and remote processing subsystem 1002. Configuration 1200 is similar to configuration 1100 in that various privacy management operations are performed by privacy application 1112 residing on user device 1004. However, in configuration 1200, the privacy profile data 1110 is maintained within a data store 1202 included in remote processing subsystem 1002. Privacy application 1112 may accordingly be configured to communicate with remote processing subsystem 1002 in order to compare privacy attributes of new application 1114 with the privacy profile represented by privacy profile data 1110.

By remotely maintaining a user's privacy profile, such as is illustrated in FIG. 12, the same privacy profile may be used to determine compliance levels of applications installed on various user devices associated with the user. For example, a user may be associated with (e.g., use) a smart phone and a tablet computer. In accordance with configuration 1200, each device may execute a privacy application (e.g., a privacy application similar to privacy application 1112) configured to communicate with remote processing subsystem 1002. In this manner, both devices may access privacy profile data 1110 and accordingly determine compliance levels of applications that the user attempts to install on either device.

Figure 13:
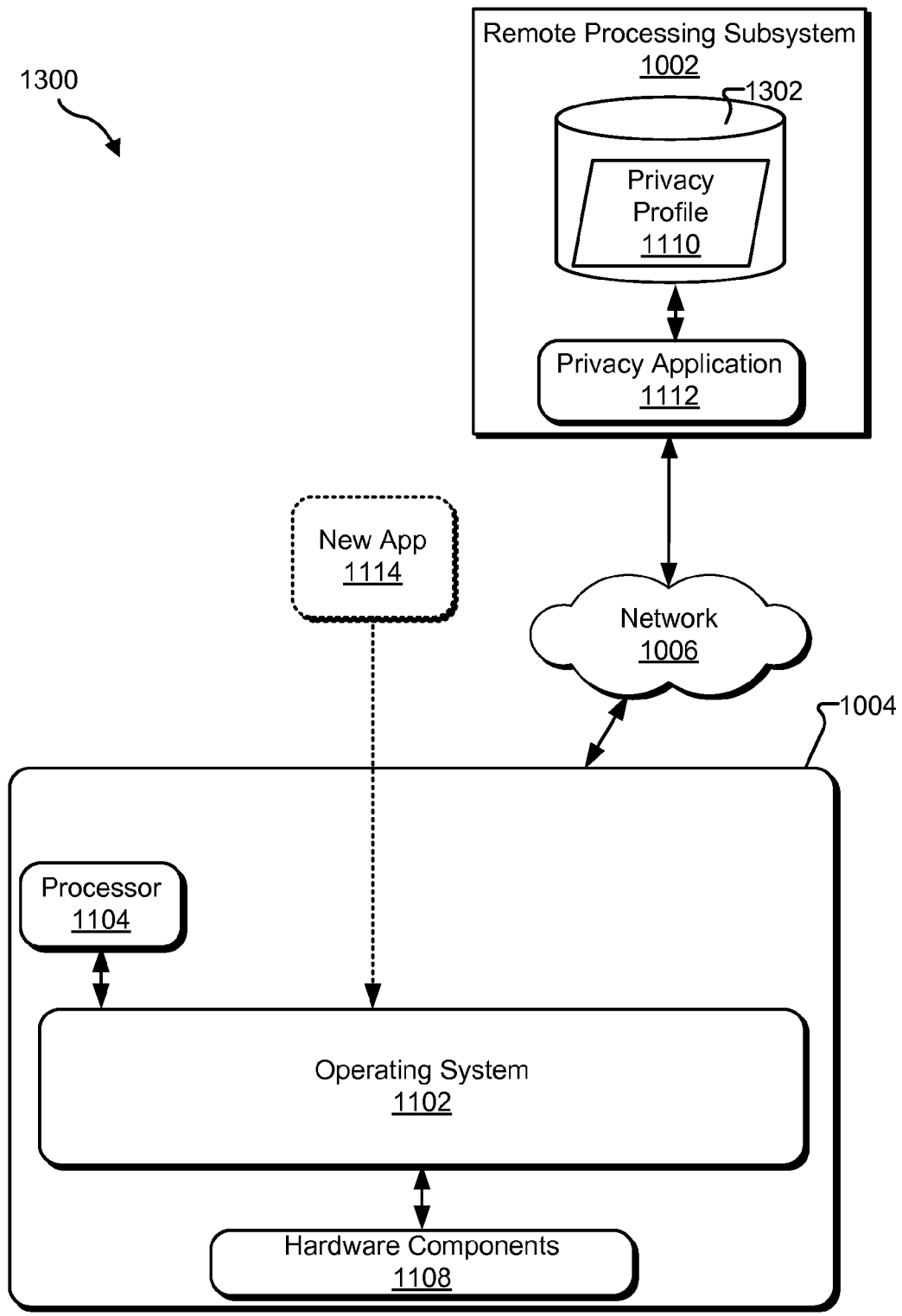

FIG. 13 shows an alternative configuration 1300 wherein system 100 is implemented by remote processing subsystem 1002. Configuration 1300 is similar to configuration 1200 in that the privacy profile data 1110 resides within data store 1202 included in remote processing subsystem 1002. However, in configuration 1300, privacy application 1112 resides on and is executed by remote processing subsystem 1002 (as opposed to configuration 1200 in which privacy application 1112 resides on and is executed by user device 1004). In some examples, operating system 1102 and/or another application executed by user device 104 may be configured to interface with privacy application 1112.

Figure 14:
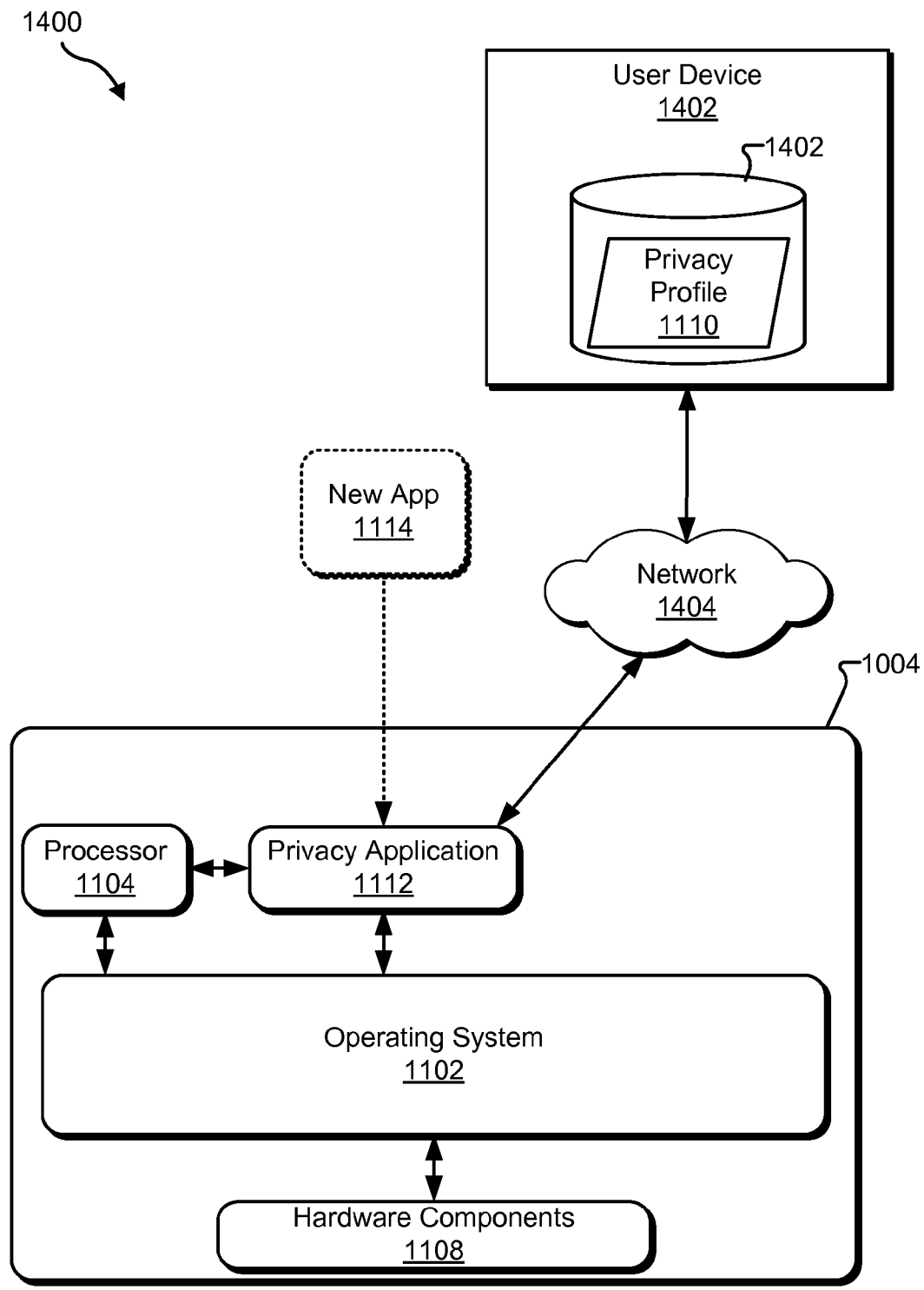

FIG. 14 illustrates another exemplary implementation 1400 of system 100 wherein the privacy profile data 1110 is maintained by another user device 1402 communicatively coupled to a network 1404 (e.g., a local area network or a home network) of which user device 1004 is a part. In implementation 1400, privacy application 1112 resides on user device 1004 and is configured to access the privacy profile data 1110 residing on user device 1402 by way of network 1404. In this manner, a user may create a privacy profile on a single user device (e.g., user device 1402) and allow other user devices associated with the user (e.g., user device 1004) to access data representative of the privacy profile stored on the single user device.

In some examples, system 100 may be configured to determine whether a particular user device complies with a privacy profile of a user and set one or more network privileges accordingly. For example, a user may utilize various user devices to which the user may not necessarily be able to install applications, but that are capable of connecting to a network and transmitting data to a remote device. Such user devices may include, but are not limited to, screen-less electronic devices, home security system devices, energy management devices (e.g., thermostats, etc.), etc.

To illustrate, system 100 may detect an attempt by a user device to connect to a network (e.g., a home network) associated with a user (e.g., by detecting a hardware identifier, digital signature, TCP port, or other identifying information associated with the user device), determine, in response to the attempt, whether the user device complies with a privacy profile associated with the user, and set one or more network privileges associated with the user device based whether the user device complies with the privacy profile. For example, if system 100 determines that the user device does not fully comply with the privacy profile associated with the user, system 100 may prevent the user device from connecting to the network. Alternatively, system 100 may provide the user device with limited network privileges (e.g., with the ability to download data by way of the network but not upload data by way of the network).

Figure 15:
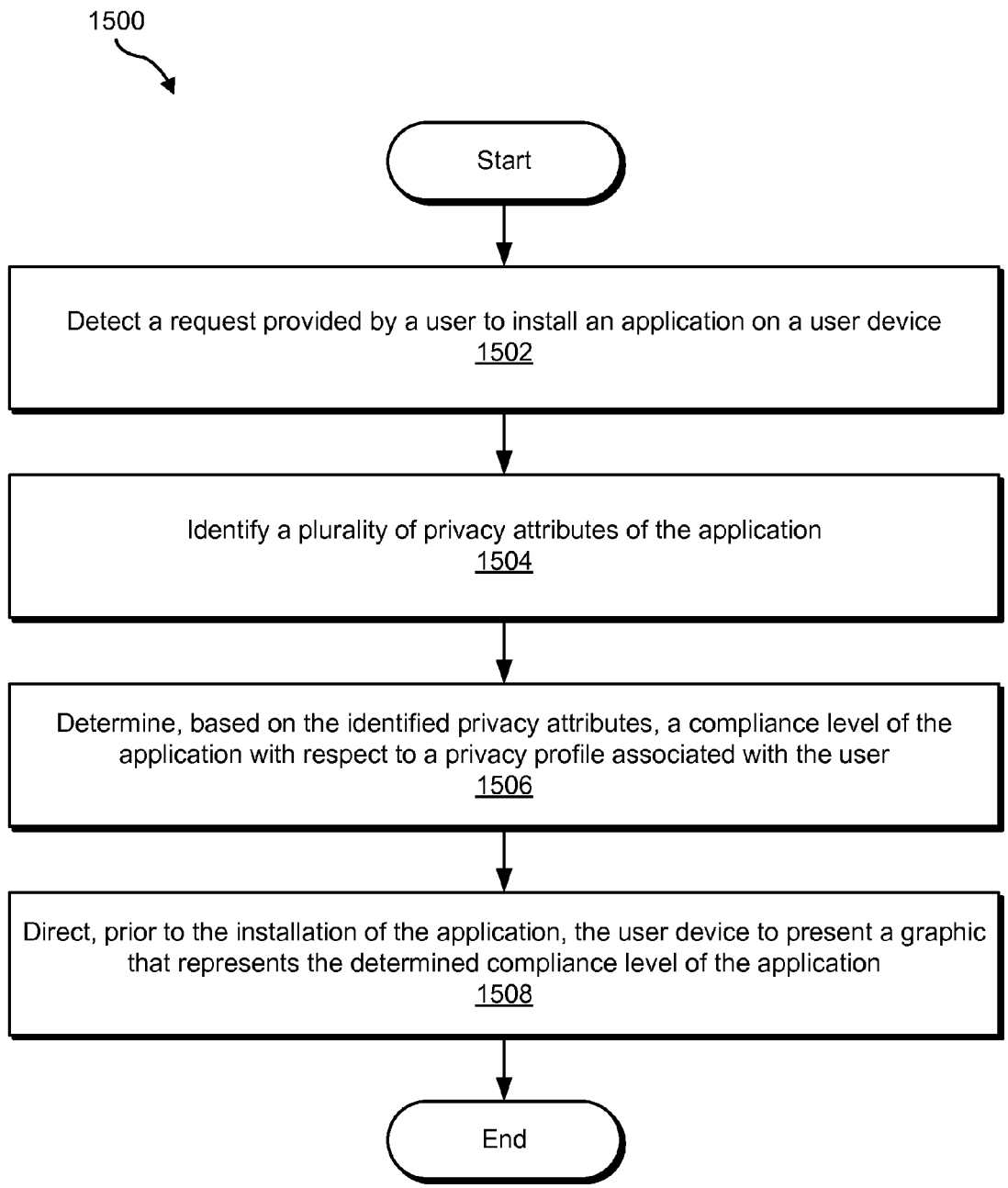
FIG. 15 illustrates an exemplary method of providing a notification of a compliance level of an application with respect to a privacy profile associated with a user according to principles described herein.

FIG. 15 illustrates an exemplary method 1500 of providing a notification of a compliance level of an application with respect to a privacy profile associated with a user. While FIG. 15 illustrates exemplary steps according to one embodiment, other embodiments may omit, add to, reorder, and/or modify any of the steps shown in FIG. 15. One or more of the steps shown in FIG. 15 may be performed by application management system 100 and/or any implementation thereof.

In step 1502, an application management system detects a request provided by a user to install an application on a user device. Step 1502 may be performed in any of the ways described herein.

In step 1504, the application management system identifies a plurality of privacy attributes of the application. Step 1504 may be performed in any of the ways described herein.

In step 1506, the application management system determines, based on the identified privacy attributes, a compliance level of the application with respect to a privacy profile associated with the user. Step 1506 may be performed in any of the ways described herein.

In step 1508, the application management system directs, prior to the installation of the application, the user device to present a graphic that represents the determined compliance level of the application. Step 1508 may be performed in any of the ways described herein.

Figure 16:
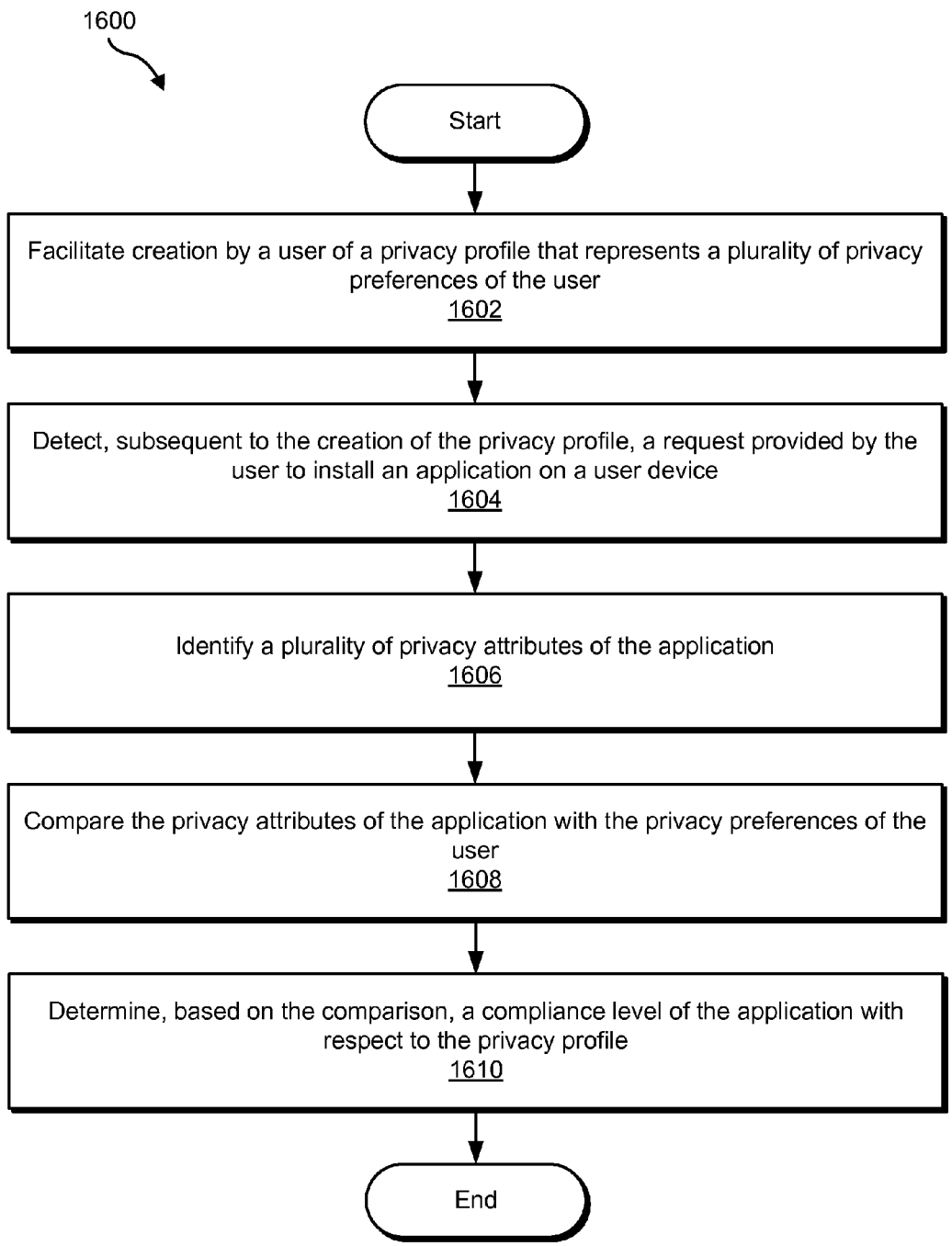
FIG. 16 illustrates an exemplary method of determining a compliance level of an application with respect to a privacy profile associated with a user according to principles described herein.

FIG. 16 illustrates a method 1600 of determining a compliance level of an application with respect to a privacy profile associated with a user. While FIG. 16 illustrates exemplary steps according to one embodiment, other embodiments may omit, add to, reorder, and/or modify any of the steps shown in FIG. 16. One or more of the steps shown in FIG. 16 may be performed by application management system 100 and/or any implementation thereof.

In step 1602, an application management system facilitates creation by a user of a privacy profile that represents a plurality of privacy preferences of the user. Step 1602 may be performed in any of the ways described herein.

In step 1604, the application management system detects, subsequent to the creation of the privacy profile, a request provided by the user to install an application on a user device. Step 1604 may be performed in any of the ways described herein.

In step 1606, the application management system identifies a plurality of privacy attributes of the application. Step 1606 may be performed in any of the ways described herein.

In step 1608, the application management system compares the privacy attributes of the application with the privacy preferences of the user. Step 1608 may be performed in any of the ways described herein.

In step 1610, the application management system determines, based on the comparison, a compliance level of the application with respect to the privacy profile. Step 1610 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 17:
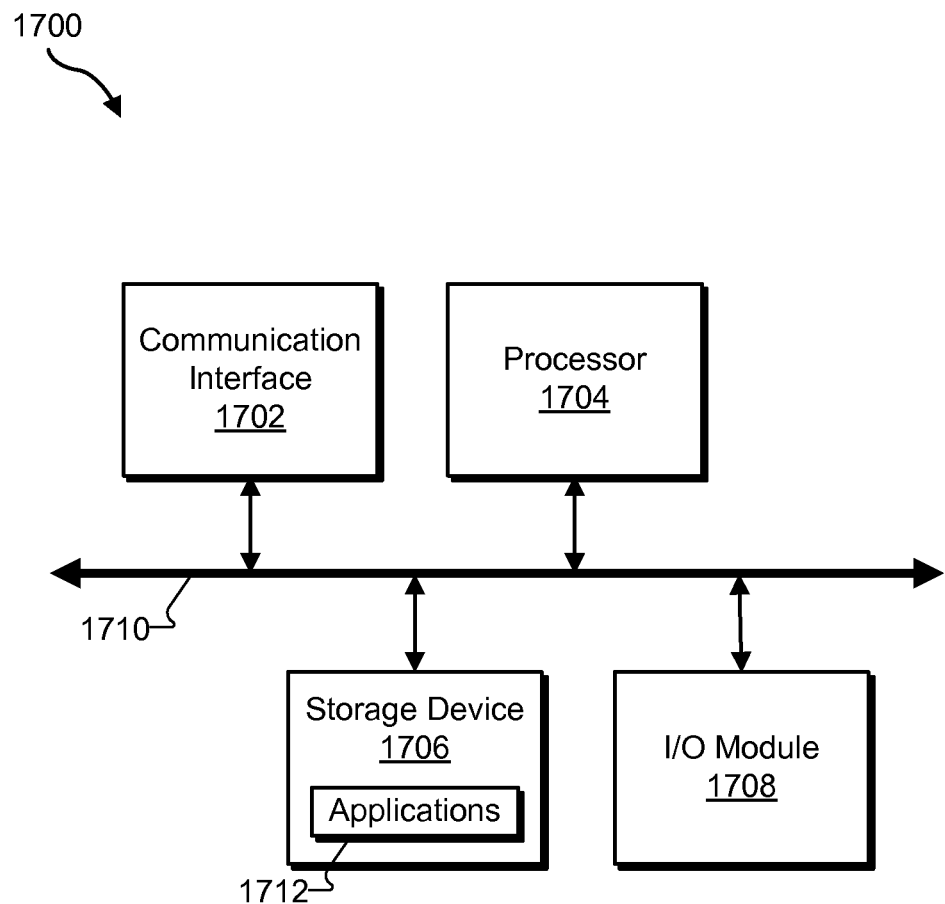
FIG. 17 illustrates an exemplary computing device according to principles described herein.

FIG. 17 illustrates an exemplary computing device 1700 that may be configured to perform one or more of the processes described herein. As shown in FIG. 17, computing device 1700 may include a communication interface 1702, a processor 1704, a storage device 1706, and an input/output ("I/O") module 1708 communicatively connected via a communication infrastructure 1710. While an exemplary computing device 1700 is shown in FIG. 17, the components illustrated in FIG. 17 are not intended to be limiting. Additional or alternative components may be used in other embodiments. Components of computing device 1700 shown in FIG. 17 will now be described in additional detail.

Communication interface 1702 may be configured to communicate with one or more computing devices. Examples of communication interface 1702 include, without limitation, a wired network interface (such as a network interface card), a wireless network interface (such as a wireless network interface card), a modem, an audio/video connection, and any other suitable interface.

Processor 1704 generally represents any type or form of processing unit capable of processing data or interpreting, executing, and/or directing execution of one or more of the instructions, processes, and/or operations described herein. Processor 1704 may direct execution of operations in accordance with one or more applications 1712 or other computer-executable instructions such as may be stored in storage device 1706 or another computer-readable medium.

Storage device 1706 may include one or more data storage media, devices, or configurations and may employ any type, form, and combination of data storage media and/or device. For example, storage device 1706 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1706. For example, data representative of one or more executable applications 1712 configured to direct processor 1704 to perform any of the operations described herein may be stored within storage device 1706. In some examples, data may be arranged in one or more databases residing within storage device 1706.

I/O module 1708 may be configured to receive user input and provide user output and may include any hardware, firmware, software, or combination thereof supportive of input and output capabilities. For example, I/O module 1708 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1708 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1708 is configured to provide graphical data to a display for presentation to a user. The graphical data may be representative of one or more graphical user interfaces and/or any other graphical content as may serve a particular implementation.

In some examples, any of the systems, subsystems, and/or facilities described herein may be implemented by or within one or more components of computing device 1700. For example, one or more applications 1712 residing within storage device 1706 may be configured to direct processor 1704 to perform one or more processes or functions associated with detection facility 102 and/or privacy management facility 104. Likewise, storage facility 106 may be implemented by or within storage device 1706.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    associating, by one or more devices, a privacy profile with a user;
    detecting, by the one or more devices and after associating the privacy profile with the user, a request provided by the user for an installation of an application on a user device;
    identifying, by the one or more devices, a plurality of privacy attributes of the application;
    determining, by the one or more devices and based on the plurality of privacy attributes of the application, a compliance level of the application with respect to the privacy profile associated with the user,
        the compliance level representing a degree to which the application complies with the privacy profile associated with the user; and
    directing, by the one or more devices and prior to the installation of the application, the user device to present a graphic that represents the determined compliance level of the application.

2. The method of claim 1, where identifying the plurality of privacy attributes of the application comprises:
    analyzing a privacy policy associated with the application; and
    identifying the plurality of privacy attributes based on analyzing the privacy policy.

3. The method of claim 1, where identifying the plurality of privacy attributes of the application comprises:
    querying at least one of a provider of the application or an entity not associated directly with the application for the plurality of privacy attributes of the application.

4. The method of claim 1, where determining the compliance level of the application comprises:
    identifying a plurality of privacy preferences represented by the privacy profile associated with the user; and
    determining the compliance level of the application by comparing the plurality of privacy attributes with the plurality of privacy preferences.

5. The method of claim 1, where determining the compliance level of the application comprises:
    comparing the plurality of privacy attributes of the application with the privacy profile associated with the user; and
    selecting the compliance level from a plurality of predefined compliance levels based on comparing the plurality of privacy attributes of the application with the privacy profile associated with the user.

6. The method of claim 5, where the plurality of predefined compliance levels comprise:
    a first compliance level representing a first degree of compliance of the application with the privacy profile associated with the user;
    a second compliance level representing a second degree of compliance of the application with the privacy profile associated with the user,
        the second degree of compliance being a lower degree of compliance than the first degree of compliance; and
    a third compliance level representing a degree of compliance of the application with the privacy profile associated with the user that is in between the first degree of compliance and the second degree of compliance.

7. The method of claim 6,
    where directing the user device to present the graphic that represents the determined compliance level comprises:
        directing the user device to present a first graphic when the first compliance level is selected as the compliance level;
        directing the user device to present a second graphic when the second compliance level is selected as the compliance level; and
        directing the user device to present a third graphic if the third compliance level is selected as the compliance level, and where the first graphic, the second graphic, and the third graphic are visually distinct one from another.

8. The method of claim 1, further comprising:
directing the user device to present, within the graphic, at least one of:
a selectable option to proceed with the installation of the application on the user device, or
a selectable option to terminate the installation of the application on the user device.

9. The method of claim 1, further comprising:
directing the user device to present, within the graphic, a description of one or more privacy attributes included in the plurality of privacy attributes of the application that are not in compliance with the privacy profile associated with the user.

10. The method of claim 1, further comprising:
providing the user with an option to manually specify one or more privacy preferences represented by the privacy profile.

11. The method of claim 1, further comprising:
providing the user with an option to select a predefined privacy profile as the privacy profile associated with the user.

12. The method of claim 11,
where the privacy profile associated with the user is the predefined privacy profile, and
where the method further comprises:
detecting a change in the predefined privacy profile; and
automatically updating the privacy profile associated with the user in accordance with the change in the predefined privacy profile.

13. The method of claim 1, further comprising:
detecting, based on the determined compliance level of the application, that the application does not fully comply with the privacy profile associated with the user; and
notifying, based on detecting that the application does not fully comply with the privacy profile associated with the user, another user that the user is attempting to install the application on the user device.

14. The method of claim 13, further comprising:
providing the other user with at least one of:
a selectable option to authorize the user to install the application on the user device, or
a selectable option to prevent the user from installing the application on the user device.

15. The method of claim 1, further comprising:
maintaining the privacy profile associated with the user within a remote processing subsystem that is separate from the user device.

16. The method of claim 1, further comprising:
detecting a request provided by the user for an installation of an additional application on an additional user device;
identifying a plurality of privacy attributes of the additional application;
determining, based on the identified privacy attributes of the additional application, a compliance level of the additional application with respect to the privacy profile associated with the user,
the compliance level of the additional application representing a degree to which the additional application complies with the privacy profile associated with the user; and
directing, prior to the installation of the additional application on the additional user device, the additional user device to present a graphic that represents the determined compliance level of the additional application.

17. The method of claim 1, further comprising:
detecting an attempt by an additional user device to connect to a network associated with the user device;
determining, based on detecting the attempt by the additional user device to connect to the network, whether the additional user device complies with the privacy profile associated with the user; and
setting one or more network privileges associated with the additional user device based on determining whether the additional user device complies with the privacy profile associated with the user.

18. The method of claim 17,
where determining whether the additional user device complies with the privacy profile associated with the user comprises:
determining that the additional user device does not fully comply with the privacy profile associated with the user, and
where setting the one or more network privileges associated with the additional user device comprises:
preventing the additional user device from connecting to the network based on determining that the additional user device does not fully comply with the privacy profile associated with the user.

19. The method of claim 1, further comprising:
identifying a plurality of privacy attributes of an additional application that is installed on the user device;
determining, based on the plurality of privacy attributes of the additional application, a compliance level of the additional application with respect to the privacy profile associated with the user,
the compliance level of the additional application representing a degree to which the additional application complies with the privacy profile associated with the user; and
directing the user device to present a graphic that represents the determined compliance level of the additional application.

20. The method of claim 19, further comprising:
directing the user device to present, within the graphic that represents the determined compliance level of the additional application, a selectable option to uninstall the additional application from the user device if the compliance level of the additional application does not fully comply with the privacy profile associated with the user.

21. The method of claim 1,
where the determined compliance level indicates that the application does not fully comply with the privacy profile associated with the user, and
where the method further comprises:
directing the user device to present, within the graphic, a selectable option to install an upgraded version of the application that more fully complies with the privacy profile associated with the user.

22. The method of claim 1, further comprising:
utilizing a privacy application executed by the user device to perform at least one of detecting the request, identifying the plurality of privacy attributes, determining the compliance level of the application, or directing the user device to present the graphic.

23. A non-transitory computer-readable storing instructions, the instructions comprising:
one or more instructions that, when executed by at least processor, cause the at least one processor to:
facilitate creation, by a user, of a privacy profile that represents a plurality of privacy preferences of the user;

associate the privacy profile with the user;

detect, subsequent to associating the privacy profile with the user, a request provided by the user for an installation of an application on a user device;

identify a plurality of privacy attributes of the application;

determine a comparison of the privacy attributes of the application with the plurality of privacy preferences of the user; and determine, based on the comparison, a compliance level of the application with respect to the privacy profile, the compliance level representing a degree to which the application complies with the privacy profile.

24. A system comprising:

one or more processors to:

associate a privacy profile with a user, identify a request to install an application on a user device of the user after associating the privacy profile with the user, identify a plurality of privacy attributes of the application, determine a compliance level of the application with respect to the privacy profile associated with the user, the compliance level representing a degree to which the application complies with the privacy profile associated with the user, and direct, prior to the installation of the application, the user device to present a graphic that represents the determined compliance level.

25. The system of claim 24, where the graphic includes information identifying one or more privacy attributes, of the plurality of privacy attributes of the application, that are not in compliance with the privacy profile associated with the user.

* * * * *